US012750328B2

(12) United States Patent

Gorbovitski et al.

(10) Patent No.: US 12,750,328 B2
(45) Date of Patent: Sep. 29, 2026

(54) L1 REPLICATOR AND SWITCH COMBINATION USING OPTICAL FABRIC

(71) Applicant: Morgan Stanley Services Group Inc., New York, NY (US)

(72) Inventors: Michael Gorbovitski, New York, NY (US); Igor G. Muskatblit, Mountain View, CA (US); Joshua N. Elijah, London (GB)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 19/259,267

(22) Filed: Jul. 3, 2025

(65) Prior Publication Data

US 2025/0330431 A1 Oct. 23, 2025

Related U.S. Application Data

(63) Continuation-in-part of application No. 18/960,924, filed on Nov. 26, 2024, now Pat. No. 12,355,678, which is a continuation of application No. 18/474,747, filed on Sep. 26, 2023, now Pat. No. 12,177,132.

(51) Int. Cl.

*H04L 49/20* (2022.01)
*H04L 45/00* (2022.01)
*H04L 49/15* (2022.01)
*H04Q 11/00* (2006.01)

(52) U.S. Cl.

CPC ............ *H04L 49/208* (2013.01); *H04L 45/66* (2013.01); *H04L 49/1576* (2013.01); *H04Q 11/0005* (2013.01); *H04Q 2011/0015* (2013.01)

(58) Field of Classification Search

CPC ...................... H04Q 11/005; H04Q 2011/0015
See application file for complete search history.

(56) References Cited

U.S. PATENT DOCUMENTS 5,577,204 A 11/1996 Brewer et al.
7,009,378 B2 * 3/2006 Blake .................. G01R 15/247 324/96
7,471,839 B2 * 12/2008 Moreira ............ H04N 21/2343 375/E7.176
8,965,203 B1 * 2/2015 Vahdat ................ H04J 14/0282 398/79
10,158,929 B1 * 12/2018 Hushchyn ................ G06F 5/06
10,630,608 B2 4/2020 Snowdon et al.
10,708,127 B1 7/2020 Acharya et al.

(Continued)

OTHER PUBLICATIONS

No Author, "Exablaze Introduces Ultra Low Latency Switch and Application Platform", retrieved from https://www.prnewswire.com/news-releases/exablaze-introduces-ultra-low-latency-switch-and-application-platform-281002252.html, dated Oct. 30, 2014, (4 pages), Melbourne, Australia.

(Continued)

*Primary Examiner* — Nathan M Cors
(74) *Attorney, Agent, or Firm* — Leason Ellis LLP

(57) ABSTRACT

A data replication and switching device includes an optical tap configured to replicate and transmit optical signals of data received over a data communication network to a processing stage and a replication port. Data acted on by the processing stage are received and replicated by an optical tap, and transmitted to the replication port and over the data communication network.

9 Claims, 8 Drawing Sheets

TWO UNIDIRECTIONAL FIBERS IMPLEMENTATION

(56) References Cited

U.S. PATENT DOCUMENTS

| | | | | |
|---|---|---|---|---|
| 11,570,138 | B2 | 1/2023 | Goodwin et al. | |
| 12,613,811 | B2 * | 4/2026 | Nahmias | G06F 13/1615 |
| 2002/0145785 | A1 * | 10/2002 | Chang | H04Q 11/0062<br>398/43 |
| 2009/0097851 | A1 * | 4/2009 | Tan | H04B 10/803<br>398/82 |
| 2011/0064408 | A1 * | 3/2011 | Connolly | H04J 14/0246<br>398/48 |
| 2014/0219650 | A1 | 8/2014 | Bruno | |
| 2017/0235695 | A1 | 8/2017 | Blankenship et al. | |
| 2019/0095373 | A1 | 3/2019 | Manohar | |
| 2021/0320887 | A1 | 10/2021 | Chen | |
| 2022/0014483 | A1 | 1/2022 | Zhou et al. | |
| 2022/0206849 | A1 | 6/2022 | Guim Bernat et al. | |
| 2022/0232111 | A1 | 7/2022 | Ford et al. | |
| 2023/0004299 | A1 | 1/2023 | Dailey et al. | |
| 2023/0066682 | A1 | 3/2023 | Catalano et al. | |

OTHER PUBLICATIONS

International Search Report and Written Opinion for correspnding PCT Application No. PCT/US2024/048149 dated Dec. 17, 2024 (14 pages).

* cited by examiner

SINGLE BIDIRECTIONAL FIBER IMPLEMENTATION

L1 REPLICATOR AND SWITCH COMBINATION USING OPTICAL FABRIC

CROSS-REFERENCE TO RELATED APPLICATIONS

This application is a continuation-in-part of U.S. patent application Ser. No. 18/960,924, filed Nov. 26, 2024, which is based on and claims priority to U.S. patent application Ser. No. 18/474,747, filed Sep. 26, 2023, now U.S. Pat. No. 12,177,132, issued Dec. 24, 2024. The entire contents of which are incorporated by reference as if set forth herein in their respective entireties.

FIELD

The present disclosure relates, generally, to data communication networking and, more particularly, to a system and method for providing latency reduction in high-speed data replication and switching applications.

BACKGROUND

Many networking applications include traffic mirroring functionality, for example, for data transmitted between two devices (e.g., a server computing device and a client computing device). Financial market applications often include traffic mirroring for a computing device configured for monitoring transmitted data, such as between a device configured for trading and a device configured for an exchange. Although implementing traffic mirroring, generally, is considered trivial to implement technically, there exists a tradeoff between case of implementation and resulting latency.

Existing applications involving traffic mirroring can include use of one or more Layer 1 ("L1") switches, which can be configured to mirror data to one or more ports. Such functionality is typically configurable such that data sent/received via a port can be mirrored to other port(s) associated with the switch. While flexibility afforded by L1 switches is useful, in very low latency systems L1 switches can be unnecessary because the ports containing the mirrors are fixed, for example, due to cable length constraints. Moreover, such flexibility can add latency, which can be suboptimal particularly in ultra-low latency systems. For example, a L1 replication capability using an off-the-shelf L1 switch can add latency between 5-10 ns.

Alternatively, full traffic mirroring can be achieved by configuring, for example, the server computing device and/or the client computer to copy data internally and, thereafter, transmit the copied data via an unused port. While effective, this approach is usually not ideal, particularly if one of the devices on the network is a third-party device, such as the server computing device. In such case, a user may not have the ability to configure mirroring. Even if such configuring is possible, costs in terms of resources to allocate specific logic and port connections to achieve basic mirroring can be too high. This can be the case where field-programmable gate array ("FPGA") systems are used, whose resource utilization can approach 100%, particularly in applications that require significant memory usage.

Notwithstanding the above-identified traffic mirroring solutions, there remains a need for providing data mirroring functionality externally from the server or the client, without adding significant latency in the data path. Regarding networking hardware, an incoming high-speed signal (10GBASE-LR or higher) from a disparate source is nearly always optical. Generally, transmitting via 10GBASE-KR (electrical) beyond three meters on copper wiring is impractical due to signal degradation. Accordingly, a conversion between optical to electrical (and vice versa) can result in latency overhead and should performed once. Such performance can be at the point of ingress/egress into an integrated circuit (e.g., a chip), which performs digital logic on the signal.

Moreover, manipulation of a binary, digital signal is a task that is well-suited to the electrical domain via digital logic. This is because of the multiple options available for applying digital logic in the electrical domain. For example, an XOR gate may be constructed from only six transistors. It is possible to achieve digital logic in the optical domain, but there are not many available off-the-shelf optical digital logic gates currently, meaning implementation requires custom optical design, which is beyond the scope of this patent. In general, optical signal processing is better suited to analog processing rather than digital processing. Expressed another way, analog processing can be described with linear mathematics such as matrices and transformations; whereas digital processing is inherently non-linear, existing in one of many discrete states. It is with respect to these and other considerations that the disclosure made herein is presented.

SUMMARY

In one or more implementations, a data replication and switching device and method are provided. A data communication port is configured to transmit and receive optical signals of data to and from at least one computing device across a first data communication network. Further, a first optical tap respectively associated with the data communication port is configured to replicate and transmit the optical signals of the data, wherein the first optical tap is further configured to transmit a copy of the optical signals of the data to a processing stage, wherein the processing stage is configured to receive and act on the data to provide optical signals of processed data. Moreover, a second optical tap respectively associated with the processing stage is configured to replicate and transmit the optical signals of the processed data. A replication port is configured to receive optical signals of the data and optical signals of the processed data and to transmit the optical signals to a second data communications network, and an optical coupler is configured to receive the optical signals of the processed data and to transmit the optical signals of the processed data to the replication port. The data replication and switching device is configured to perform operations including: receive and replicate, by the first optical tap, the optical signals of the data received from the data communications port; transmit, by the first optical tap, the replicated optical signals of the data to the replication port, to be provided by the replication port across the second data communication network; transmit, by the first optical tap, a copy of the optical signals of the data to the processing stage; receive, by the first optical tap from the processing stage, and replicate, by the first optical tap, the optical signals of the processed data; transmit, by the first optical tap, a copy of the optical signals of the processed data to the data communications port to be provided across the first data communication network; transmit, by the first optical tap, the replicated optical signals of the processed data to the optical coupler; and transmit, by the optical coupler, the replicated optical signals of the processed data to the replication port. The replicated optical signals of the processed data are transmitted to the second data communications network, and further the data replication and switching device is configured to perform operations including: receive and replicate, by the first optical tap, the optical signals of the data received from the data communications port; transmit, by the first optical tap, the replicated optical signals of the data to the replication port, to be provided by the replication port across the second data communication network; transmit, by the first optical tap, a copy of the optical signals of the data to the processing stage; receive and replicate, by the second optical tap, the optical signals of the processed data from the processing stage; transmit, by the second optical tap, a copy of the optical signals of the processed data to the data communications port to be provided across the first data communication network; transmit, by the second optical tap, the replicated optical signals of the processed data to the optical coupler; transmit, by the optical coupler, the replicated optical signals of the processed data to the replication port, wherein the replicated optical signals of the processed data are transmitted to the second data communications network.

In one or more implementations, the first optical tap is configured as a single, bi-directional fiber replicator.

In one or more implementations, the first optical tap is a bidirectional thin film filter optical tap.

In one or more implementations, each of the first optical tap and the second optical tap is configured as a unidirectional, dual fiber replicator.

In one or more implementations, the unidirectional, dual fiber replicator includes a fused biconical taper optical tap.

In one or more implementations, the device is integrated into a photonic chip.

In one or more implementations, the first data communication network and the second data communication network are the same network.

In one or more implementations, the first data communication network and the second data communication network are different networks.

In one or more implementations, a management port is configured to receive the optical signals of the data received from the data communications port.

Other features of the present disclosure are shown and described herein

BRIEF DESCRIPTION OF THE DRAWINGS

Aspects of the present disclosure will be more readily appreciated upon review of the detailed description of its various embodiments, described below, when taken in conjunction with the accompanying drawings, of which.

DETAILED DESCRIPTION

By way of overview and introduction, the present disclosure provides systems and methods for, among other things, facilitating data traffic mirroring in networked applications with significantly reduced latency. The present disclosure supports replication and switching, in which replication (or splitting) can be regarded as a simple linear operation. Switching can also be regarded as linear, for including a signal to be either present (on) or not present (off) on a particular output. Accordingly, the present disclosure includes a method and system which reduces or eliminates an electrical conversion and performs replication and switching in the optical domain.

Figures 1A, 1B:
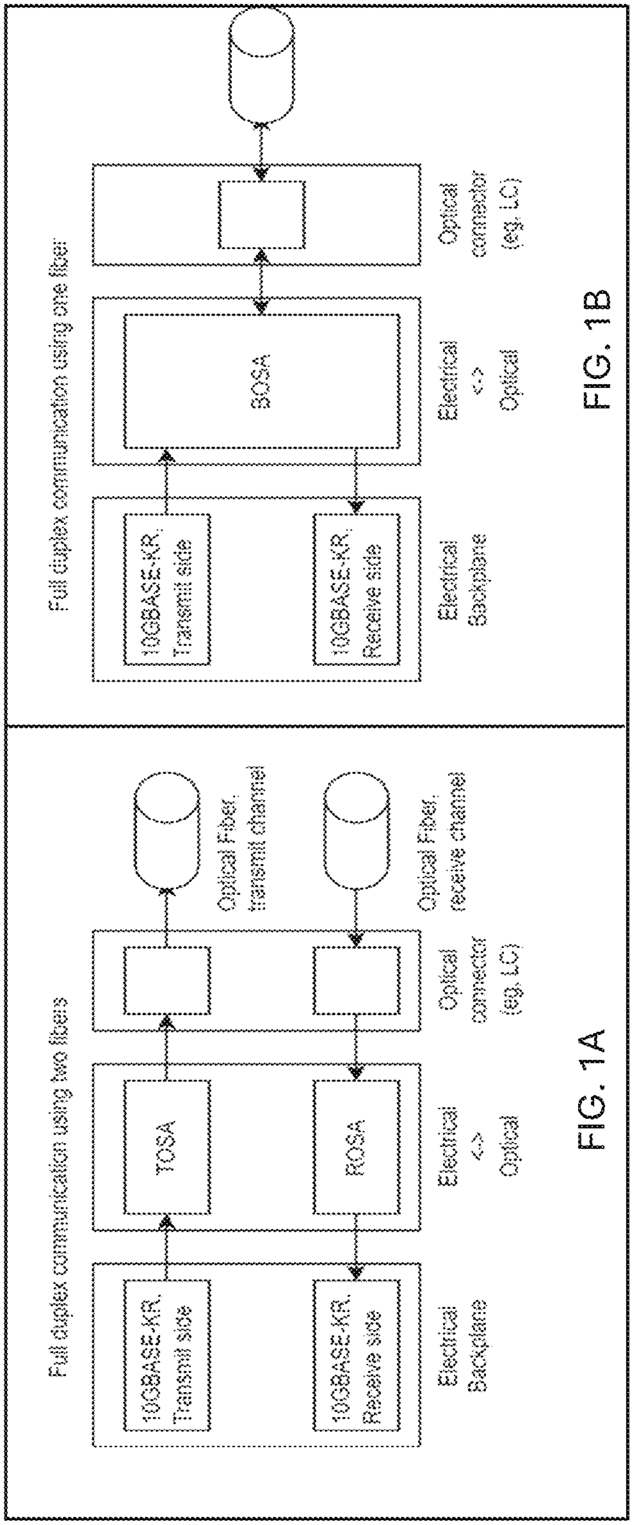
FIGS. 1A and 1B illustrate respective implementations of basic types of optical communication, including a transmit optical sub-assembly ("TOSA") and receive optical sub-assembly ("ROSA")

In one or more implementations of the present disclosure, an ethernet port is included for full duplex communication. In optical ethernet, transmit (Tx) and receive (Rx) lines can be occur as a function of two optical fibers, with light traveling in different directions. Examples can include 10GBASE-LR, 10GBASE-SR. Full duplex communication can also be achieved via a single bidirectional fiber carrying two wavelengths of light, each traveling in a different direction, for example, 10GBASE-BX. In such cases, an optical fiber includes similar optical characteristics for two separate wavelengths, such as to account for absorption, internal reflection, dispersion, or the like, and provides for transmission and reception of signals sharing the optical medium without interference. FIGS. 1A and 1B illustrate respective implementations of basic types of optical communication, including a transmit optical sub-assembly ("TOSA") and receive optical sub-assembly ("ROSA") in the example shown in FIG. 1A and a bidirectional optical sub-assembly ("BOSA") in the example shown in FIG. 1B.

The present disclosure provides a layered approach in which data can pass through one or more optical replicators that provide data mirroring along fixed paths. Optical replicators are useful for improving performance. In addition to providing data mirroring, optical signals can be routed, for example, to an optical cross-bar switch that provides 1:N and N:1 mapping of data between ports. Further to this sub-L1 replication and L1 switching, a L2 device can be included, which can be configured to operate electrically or optically.

Figure 2:
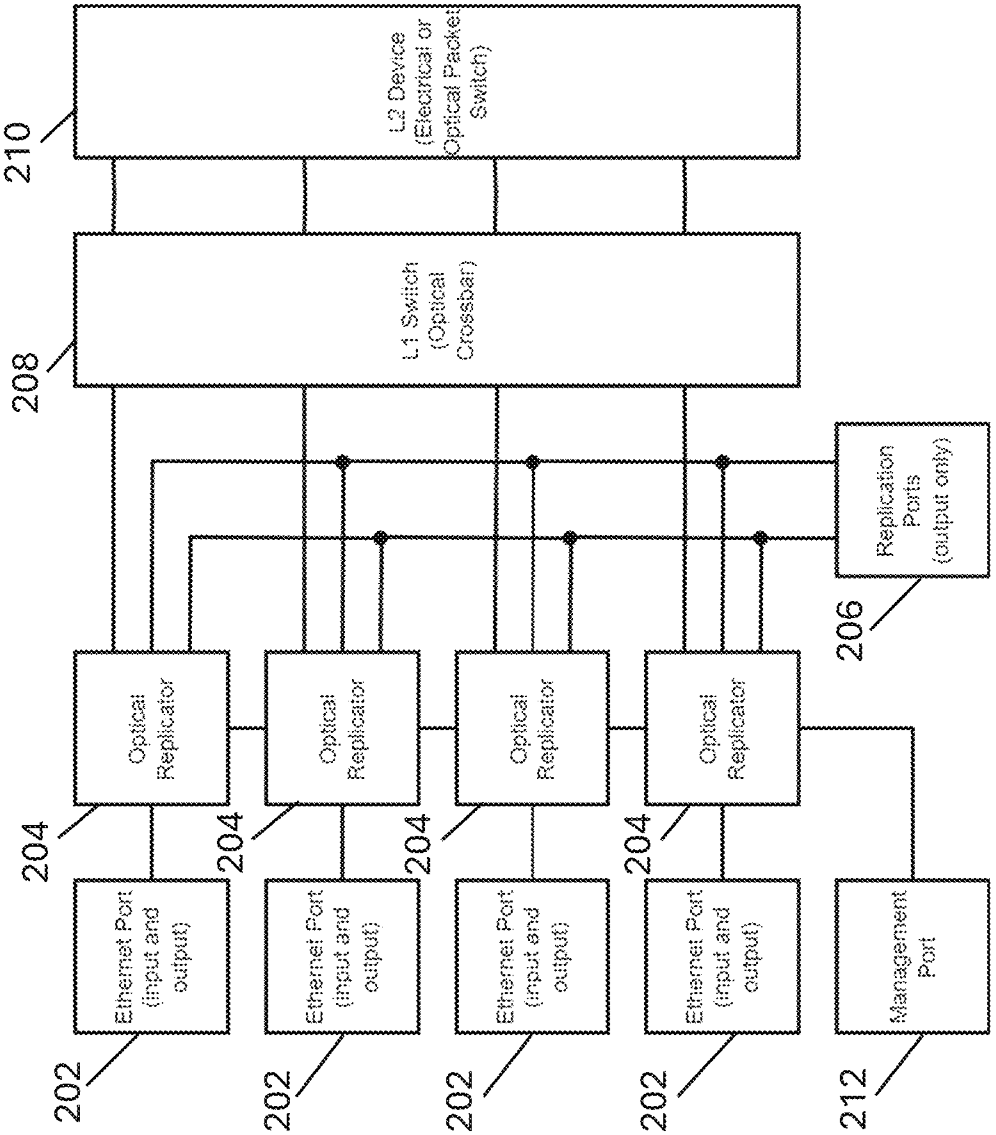
FIG. 2 shows a high-level view, which includes an optical communication assembly and avoids a need for bypassing channels, in accordance with an example implementation of the present disclosure.

FIG. 2 shows a high-level view of an example implementation of the present disclosure, which includes an optical communication assembly and avoids a need for bypassing channels. As illustrated in FIG. 2, a plurality of Ethernet ports 202 are included for input and output connectivity to and from one or more computing devices. Optical replicators 204 are respectively coupled to Ethernet ports 202, and respectively received optical signals 20 can be split and transmitted to replication ports 206, as well as optionally to L1 switch (e.g., an optical crossbar) 208 and L2 Device (electrical or optical packet switch). In the implementation shown in FIG. 2, management port 212 is illustrated that is configured to receive a signal, via optical replicator(s) 204.

In accordance with one or more implementations of the present disclosure, replication of an optical signal can be achieved actively or passively, for example, via optical taps. Implementations including active optical replication can include use of electrical circuitry, such as a receiver and re-transmitter. In such instances, an optical to electrical conversion occurs, following electrical replication and, thereafter, an electrical to optical conversion. Alternatively, a passive approach includes steps for splitting an optical signal (e.g., into two halves) and implementing optical taps, such as a fused biconical taper or thin film filter, with each option carrying potential advantages and disadvantages. Fused biconical taper, for example, can result in a relatively high insertion loss but, generally, is relatively simple to manufacture. The thin film filter approach provides for lower insertion loss than a fused biconical taper approach but, generally, is harder to manufacture. Use of passive optical taps in accordance with the teachings herein can be achieved via a custom length cable-based fiber tap, or, alternatively, integrated into a photonic chip which provides a small option and reduce latency as a result.

Figure 3:
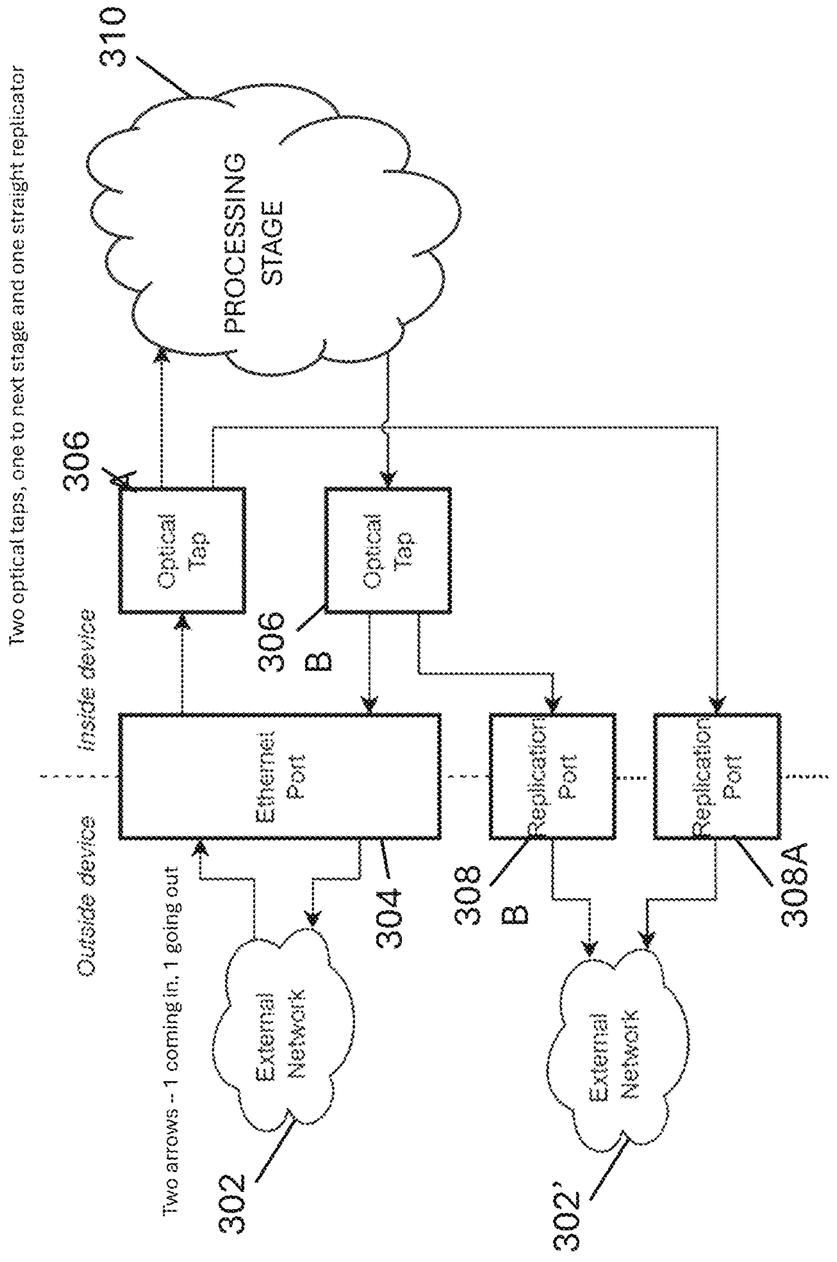
FIG. 3 illustrates an optical replication stage including separate optical Tx and Rx fibers, in accordance with an example implementation of the present disclosure.

Accordingly, the present disclosure accounts for separate transmit and receive lines of optical transmissions and, alternatively, a single bidirectional optical transmission line. FIG. 3 illustrates an example implementation of the present disclosure, in which optical replication stage includes separate optical Tx and Rx fibers. In the example shown in FIG. 3, a plurality of dual fiber unidirectional replicators illustrated in FIG. 3 uses two optical taps to replicate each signal. One of ordinary skill in the art will recognize that the optical replication structure having separate TX and RX fibers is structurally similar, at a high level, to a purely electrical replication structure. As illustrated in FIG. 3, signals are received from Ethernet network 302 via Ethernet port 304. Two 1: n dual fiber unidirectional optical tap replicators 306A and 306B are illustrated, which are configured at least for copying a signal n-times. Advantageously, use of optical replicators 306A and 306B preclude a need to convert optical signals to electrical signals, and vice-versa, thereby eliminating interruption and incurring latency. As illustrated in FIG. 3, replication can be achieved without interrupting the data path (both ingress and egress data pathways) by passing through a first copy of data. In the case of egress data, signals from port 304 pass through a respective replicator (optical tap) 306A, and a first copy is passed from the optical tap 306A, for example, to a respective Ethernet port (not shown) for connection to one or more external network devices (processing stage 310). A second copy of the optical tap is routed to replication port 308A. Continuing with reference to FIG. 3, optical signal from processing stage 310 is received by optical tap 306B, and a first copy is passed to Ethernet port 304 for transmission to Ethernet network 302. A second copy is routed to replication port 308B, for transmission to Ethernet network 302', which may be the same or different network as network 302.

Figure 4:
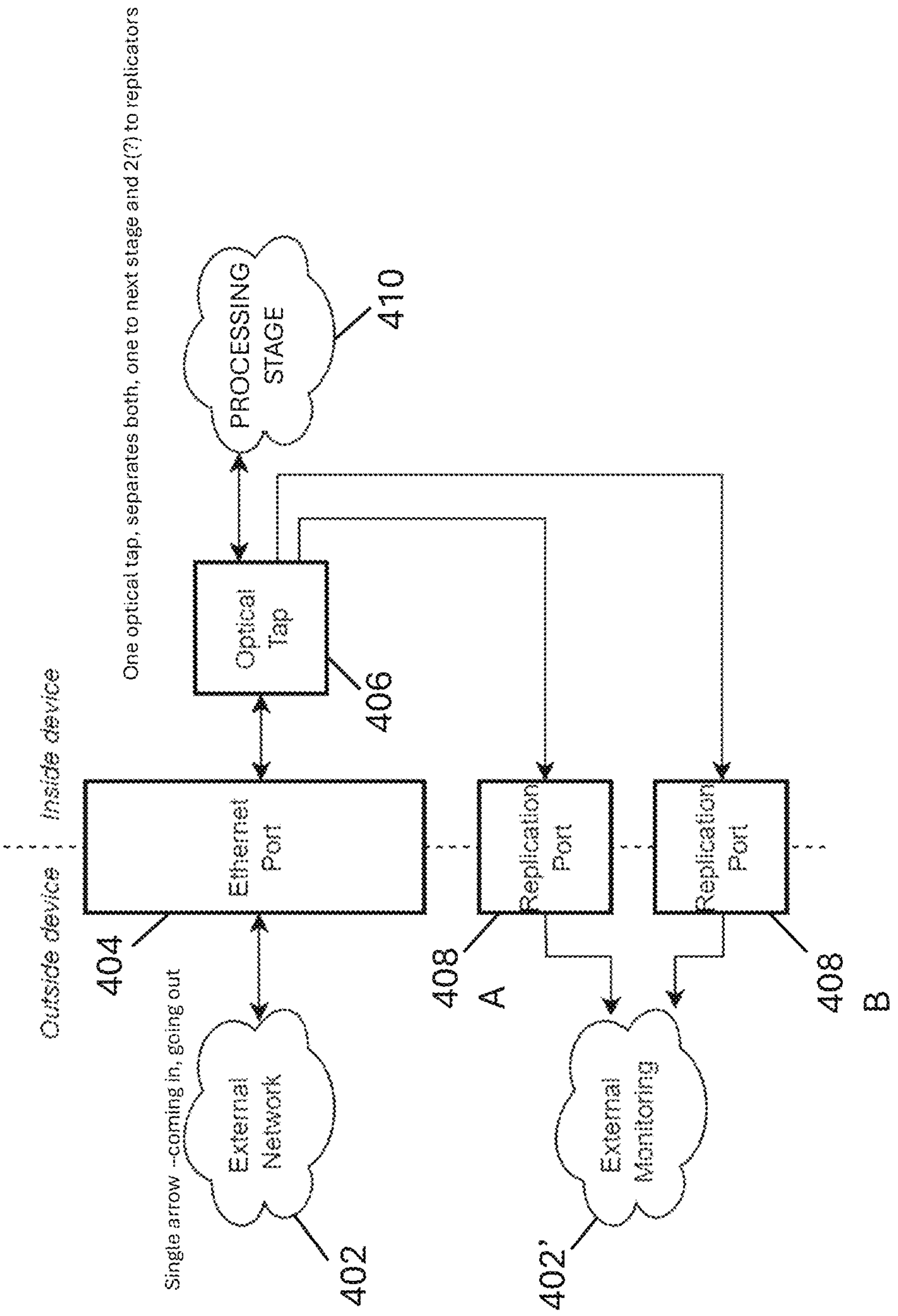
FIG. 4 illustrates an optical replication stage including a single, bi-directional Tx and Rx fiber, in accordance with an example implementation of the present disclosure.

FIG. 4 illustrates an example implementation of the present disclosure, in which optical replication stage includes a single, bi-directional Tx and Rx fiber. Alternatively, the single fiber bidirectional replicator uses a single optical tap that separates two wavelengths of light and presents the two wavelengths as two outgoing signals to each respective replication port. As illustrated in FIG. 4, signals are received from Ethernet network 402 via Ethernet port 404. Al:n bidirectional optical tap replicator 406 is illustrated, which is configured at least for copying a signal n-times. Advantageously, use of optical replicator 406 preclude a need to convert optical signals to electrical signals, and vice-versa, thereby eliminating interruption and incurring latency. As illustrated in FIG. 4, replication can be achieved without interrupting the data path (both ingress and egress data pathways) by passing through a first copy of data. In the case of egress data, signals from port 404 pass through optical tap 406 and a first copy is passed, for example, to a respective Ethernet port (not shown) for connection to one or more external network devices (processing stage 410). A second copy of the optical tap is routed to replication port 408A. Continuing with reference to FIG. 3, optical signal from processing stage 410 is received by optical tap 406, and a first copy is passed to Ethernet port 404 for transmission to Ethernet network 402. A second copy is routed to replication port 408B, for transmission to Ethernet network 402', which may be the same or different network as network 402.

The implementations shown and described with regard to FIGS. 3 and 4 are represented as being exclusive to each other, in which a different device configuration is provided for each type of optical transmission. It is recognized herein that such configuration can be impractical, which the present disclosure addresses in one or more implementations, as shown and described herein.

Figure 5:
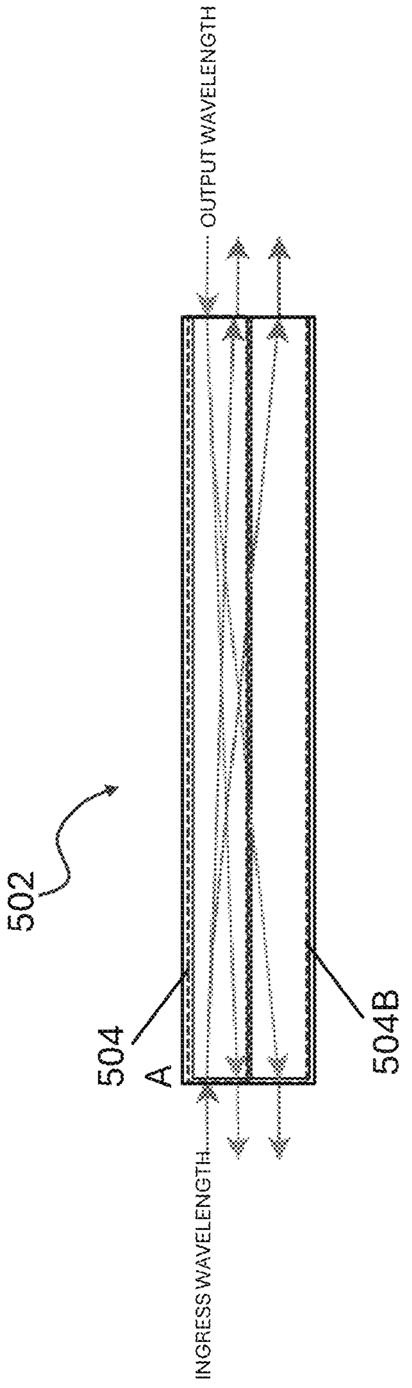
FIG. 5 illustrates an example fused biconical taper (FBT) tap, having a source fiber and a mirror fiber, in accordance with an example implementation of the present disclosure.

FIG. 5 illustrates an example fused biconical taper (FBT) tap, 502 having a source fiber 504A and a mirror fiber 504B. In the example shown in FIG. 5, light is illustrated as traveling in each direction and effectively essentially separated out. As illustrated in FIG. 5, two fiber cores (source fiber 504A and mirror fiber 504B) are positioned very close to each other, such that light from one fiber couples into the other. The light is coupled directionally, and light from one side is mirrored in one direction.

Figure 6:
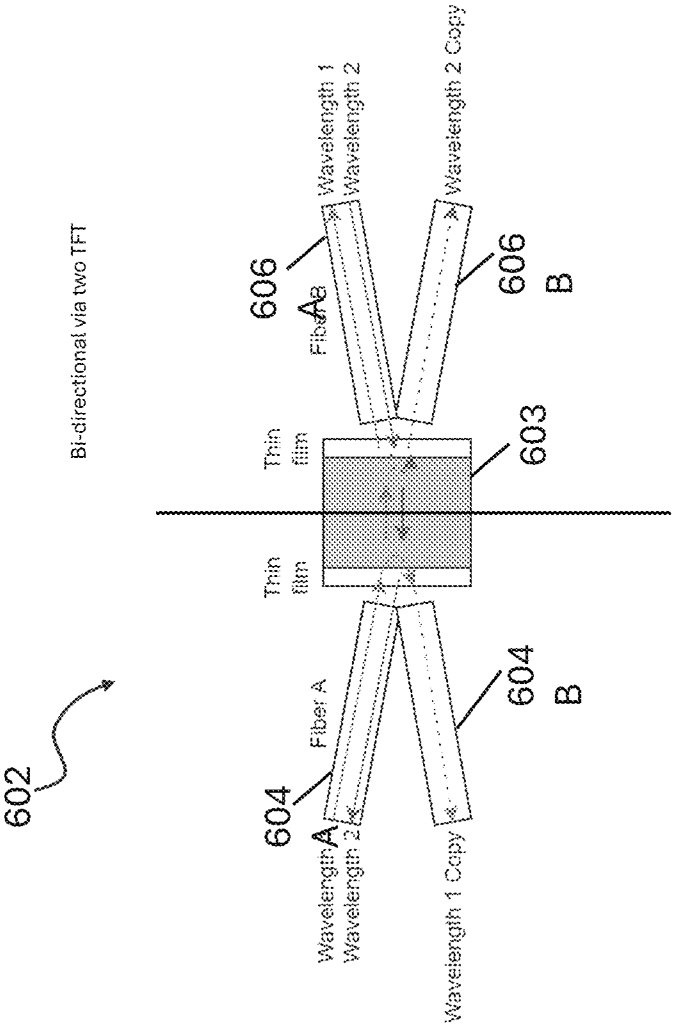
FIG. 6 illustrates an example bidirectional thin film filter (TFF) optical tap, which provides a stack of layers that reflect back some incoming light while simultaneously allowing some light through, in accordance with an example implementation of the present disclosure.

FIG. 6 illustrates an example bidirectional thin film filter (TFF) optical tap 602 which, unlike FBT tap 502, provides a stack of layers that reflect back some incoming light, while simultaneously allowing some light through. The reflected light is usable as a replicated signal, while the rest of the signal propagates through the filter. For a bidirectional signal, a dual thin-film filter 603 design is provided, which achieves replication of both directions of light, as shown in FIG. 6. As illustrated in FIG. 6, wavelength 1 enters via fiber A (604A) and a copy of wavelength 1 reflects back via fiber A (604B). Further, wavelength 1 passes via Filter B (606A), for further processing, such as processing stage 410. Wavelength 2 is received, such as from processing stage 410, and a copy of wavelength 2 reflects back via fiber B (606B). A copy of wavelength 2 pass through TFF optical tap 602 via fiber A (604A). Use of a thin film fiber, such as the example illustrated in FIG. 6, is particularly useful due to lower insertion loss at higher speeds.

Figure 7:
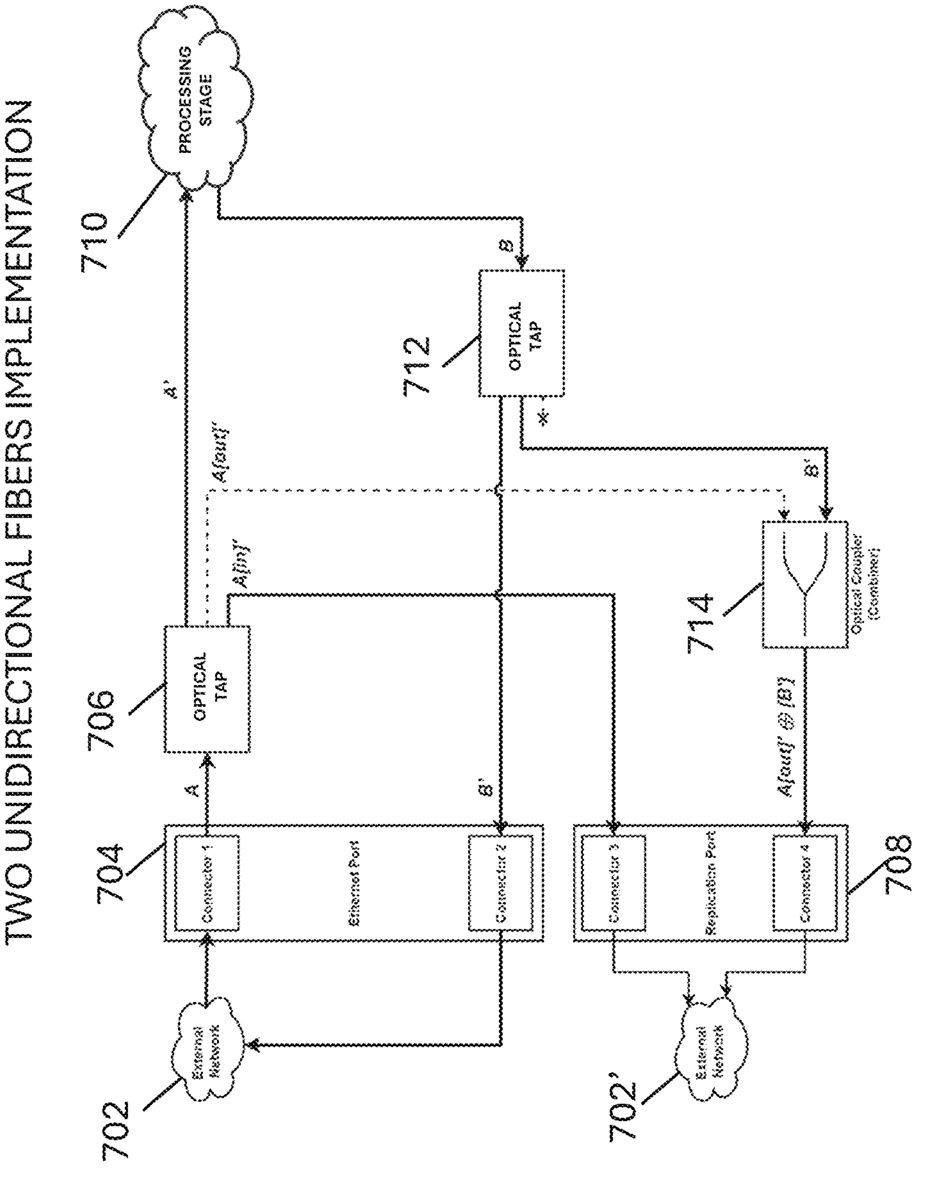
FIG. 7 shows an example implementation of a that is configured to support unidirectional fibers, in accordance with an example implementation of the present disclosure.

Referring now to FIG. 7, an example implementation is illustrated showing a system that is configured to support unidirectional fibers. As illustrated in FIG. 7, signal A enters through connector 704 from an external network 702. Signal A is via a unidirectional fiber, with light entering as input to the device. In operation, signal A hits the optical tap 706, a copy of Signal A (Signal A') exits optical tap 706 and progresses to processing stage 710. Furthermore, incoming component of signal A (A[in]) is copied by optical tap 706, and passed to connector 3 of replication port 708. Since signal A is a unidirectional signal, no outgoing component (A[out]) exits, as represented in broken lines. Continuing with reference to the example implementation shown in FIG. 7, signal B is an outgoing component from processing stage 710, which hits a second optical tap 712 and is copied as signal B'. Signal B' is received by, for example, optical coupler 714 and signal B' propagates through optical coupler 714, out onto connector 4 of replication port 708, which is transmitted to external network 702'. The implementation illustrated in FIG. 7 are similar to that shown in FIG. 3.

Figure 8:
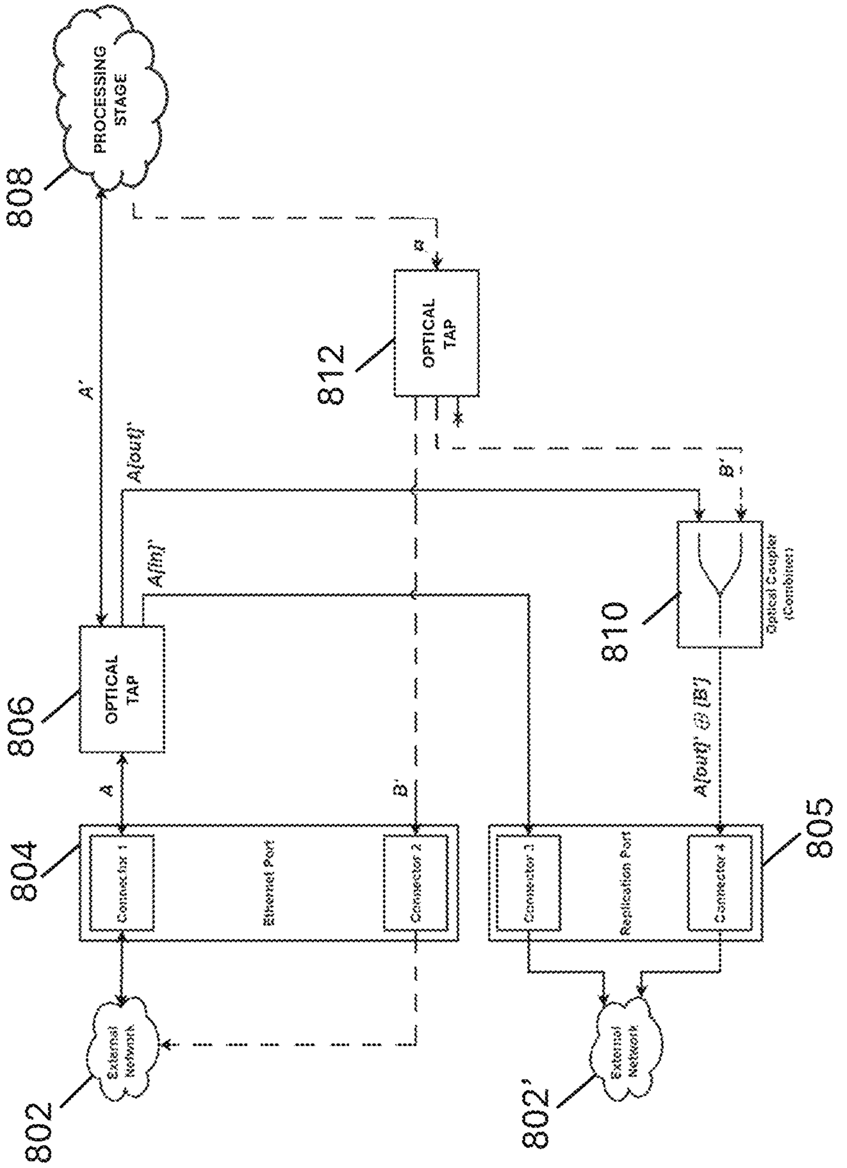
FIG. 8 illustrates an example implementation supporting a single bidirectional fiber.

FIG. 8 illustrates an example implementation supporting a single bidirectional fiber. As shown in FIG. 8, signal A connects to connector in port 804 from the external network 802. Signal A is a bidirectional signal that includes both A[in] signal from external network 802 to optical tap 806) and A[out] signal, which includes output from processing stage 808, from optical tap 806 to external network 802. In other words, the incoming component of signal A (A[in]) propagates through optical tap 806 onto A', and onto processing stage 808 of the device. Outgoing component of Signal A (A[out]) is provided by processing stage 808 of the device and is copied back onto A, propagating to the external network 802 via port 804. Furthermore, A[in] is copied and one copy, A[in]', propagates through to connector 3 of replication port 805. Further, A[out] is copied to A[out]' and passed to optical coupler 810. Since B is empty, only A[out]' propagates through optical coupler 810 via connector 4 (replicator port 805), and transmitted to external network 802'. Accordingly, the design illustrated in FIG. 8 includes a single bidirectional fiber and shows broken lines to represent unused/empty fiber 812. Note that the output to connector 4 can be A[out]' Cored with B'. One signal will be present on that fiber at a time.

The example implementations illustrated in FIGS. 7 and 8 solve issues associated with bidirectional and unidirectional fibers. Those implementations include one type of replication port is presented. The optical taps which are passive and can only spilt the light energy from one beam into two, lower powered beams. Thus, while it is possible to cascade these taps to provide more replication ports, doing so would reduce light levels and could cause data to be lost.

Accordingly, as shown and described herein, the present disclosure fuses use of both a dual fiber unidirectional replicator and a single, bi-directional Tx and Rx fiber replicator in a single design. Passive optical taps split light energy from one beam into two, albeit, lower powered beams. While such taps can be cascaded to provide more replication ports, doing so can reduce light levels and cause data loss. Accordingly, while cascading taps can be provided and is within the scope of the present disclosure, implementations of the present disclosure often include a single replication port.

Further, optical taps can be provided that provide a specific split ratio other than, for example, 50:50. A split ratio 70:30 can be provided, as known in the art, in which 70% output is used to connected to the next stage of the network, and 30% output is connected to the monitoring port. In such instances, the monitoring port can be configured physically closer to the location of the optical tap than the destination of the fiber. In this way, a lower light level is acceptable, including if cabling is kept short.

In accordance with the present disclosure, for signals incoming to the device the 30% output can be connected to the rest of the device, whereas the 70% can be connected to the replication port. Internal optical routing of the device can be fixed and known ahead of time, thus can be designed to work with a 30% output, in contrast to an external network where external wiring cannot be known at the time or, at least, not known at the level of design for this device. In one or more implementations, for signals outgoing from a device, 70% output can be connected to the external network whereas 30% output can be connected to the replication port. Notwithstanding this configuration option, one or more design implementations may be better-suited to retain a 50:50 split, including for system design simplicity.

Thus, as shown and described herein, the present disclosure provides improvements over known systems, including for improving significant latency reduction. Configurations in implementations of the present disclosure eliminate a need to convert optical signals to electrical ones, for example, via an SFP and SFP transfer transceiver. As shown and described herein, respective configurations in a replicator/switch system (e.g., a single integrated device) can be provided that include full traffic mirroring in a network with significant reduction in latency.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this disclosure, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A data replication and switching device, comprising:

a data communication port, configured to transmit and receive optical signals of data to and from at least one computing device across a first data communication network;

a first optical tap respectively associated with the data communication port and configured to replicate and transmit the optical signals of the data, wherein the first optical tap is further configured to transmit a copy of the optical signals of the data to a processing stage, wherein the processing stage is configured to receive and act on the data to provide optical signals of processed data;

a second optical tap respectively associated with the processing stage and configured to replicate and transmit the optical signals of the processed data;

a replication port configured to receive optical signals of the data and optical signals of the processed data and to transmit the optical signals to a second data communications network; and an optical coupler, configured to receive the optical signals of the processed data and to transmit the optical signals of the processed data to the replication port, wherein the data replication and switching device is configured to perform operations including:

receive and replicate, by the first optical tap, the optical signals of the data received from the data communications port;

transmit, by the first optical tap, the replicated optical signals of the data to the replication port, to be provided by the replication port across the second data communication network;

transmit, by the first optical tap, a copy of the optical signals of the data to the processing stage;

receive, by the first optical tap from the processing stage, and replicate, by the first optical tap, the optical signals of the processed data;

transmit, by the first optical tap, a copy of the optical signals of the processed data to the data communications port to be provided across the first data communication network;

transmit, by the first optical tap, the replicated optical signals of the processed data to the optical coupler; and transmit, by the optical coupler, the replicated optical signals of the processed data to the replication port, wherein the replicated optical signals of the processed data are transmitted to the second data communications network, and further wherein the data replication and switching device is configured to perform operations including:

receive and replicate, by the first optical tap, the optical signals of the data received from the data communications port;

transmit, by the first optical tap, the replicated optical signals of the data to the replication port, to be provided by the replication port across the second data communication network;

transmit, by the first optical tap, a copy of the optical signals of the data to the processing stage;

receive and replicate, by the second optical tap, the optical signals of the processed data from the processing stage;

transmit, by the second optical tap, a copy of the optical signals of the processed data to the data communications port to be provided across the first data communication network;

transmit, by the second optical tap, the replicated optical signals of the processed data to the optical coupler;

transmit, by the optical coupler, the replicated optical signals of the processed data to the replication port, wherein the replicated optical signals of the processed data are transmitted to the second data communications network.

2. The device of claim 1, wherein the first optical tap is configured as a single, bi-directional fiber replicator.

3. The device of claim 2, wherein the first optical tap is a bidirectional thin film filter optical tap.

4. The device of claim 1, wherein each of the first optical tap and the second optical tap is configured as a unidirectional, dual fiber replicator.

5. The device of claim 4, wherein the unidirectional, dual fiber replicator includes a fused biconical taper optical tap.

6. The device of claim 1, wherein the device is integrated into a photonic chip.

7. The device of claim 1, wherein the first data communication network and the second data communication network are the same network.

8. The device of claim 1, wherein the first data communication network and the second data communication network are different networks.

9. The device of claim 1, further comprising a management port, configured to receive the optical signals of the data received from the data communications port.

* * * * *